W. C. ELY.
METAL WORKING FURNACE.
APPLICATION FILED DEC. 21, 1911.

1,155,410.

Patented Oct. 5, 1915.
5 SHEETS—SHEET 4.

Witnesses.
G. W. Dumaris Jr.
Edgar P. Beaubien

Inventor
Walter C. Ely
By Brown & Co.
Attys.

UNITED STATES PATENT OFFICE.

WALTER C. ELY, OF TERRE HAUTE, INDIANA.

METAL-WORKING FURNACE.

1,155,410.  Specification of Letters Patent.  Patented Oct. 5, 1915.

Application filed December 21, 1911. Serial No. 667,180.

*To all whom it may concern:*

Be it known that I, WALTER C. ELY, a citizen of the United States, residing at Terre Haute, in the county of Vigo and State of Indiana, have invented a certain new, useful, and Improved Metal-Working Furnace, of which the following is a full, clear, and exact description.

My invention relates to metal working furnaces, and has more particular reference to furnaces for reworking metal, such as iron and steel scrap, puddled iron and the like.

The object of my invention primarily is to provide an improved metal working furnace which will rapidly and thoroughly, and without manual handling or intervention, mechanically convert a charge of scrap metal directly into a workable bloom.

A further object is to provide an improved furnace which will mechanically carry into effect the process disclosed in this application and described and claimed in my companion application, Serial Number 667,179, filed December 21, 1911, entitled "Process of producing blooms from scrap metal."

A further object of my invention is to provide an improved large capacity rotary or oscillatory furnace which will in one operation mechanically form the scrap metal charge into a homogeneous, uniformly heated, workable bloom; which may be charged, operated and discharged without disturbing its position with respect to the source of heat, and without interference with or interruption to the use of the excess or waste heat for other purposes; and which may be completely controlled from a safe and convenient distance by one man in full view of the entire apparatus.

A further object of my present invention is to provide an improved furnace structure which may be easily assembled and disassembled for the purpose of relining and repair, and which will have its parts independently lined with refractory material and thereby readily be adaptable to the assembling and disassembling of the structure.

To the attainment of these ends, and the accomplishment of other new and useful objects, as will appear hereafter, my invention consists in the features of novelty disclosed in construction, combination and arrangements of the parts hereinafter more fully described and claimed, and shown in the accompanying drawings which illustrate one embodiment of my invention and in which—

Fig. 3 is a side elevation of the furnace shown in Fig. 2; Figs. 8 and 9 are details enlarged to show the cheek plates at the edges of the door and upper side plate sections, Fig. 9 being a section on line 9—9, Fig. 8.

The apparatus shown in the drawings is designed for rapid work and large charges, much larger in fact than the present manual and mechanical furnaces, all of which produce "balls" of metal which must necessarily be put through a separate, or intermediate "squeezing" process before the mass of metal can be utilized. The structure shown may be called a gravity furnace in the sense that the chamber in which the metal is heated is rotated or oscillated, and the metal, due to the action of gravity is caused to travel along the interior surface thereof. In this structure the metal working surface is arranged in substantially the form of a rectangle and forms a continuous path for the charge. In the direction of the longitudinal axis of the charge, however, this surface is straight, and is preferably maintained level at all times during the rotation or oscillation of the furnace so that the action of gravity will cause the metal to move uniformly and not pile up at one end of the furnace.

The metal working chamber is indicated generally by A. Its rectangular shape possesses advantages over other geometrical forms, these advantages appearing as this description proceeds.

Figure 6:
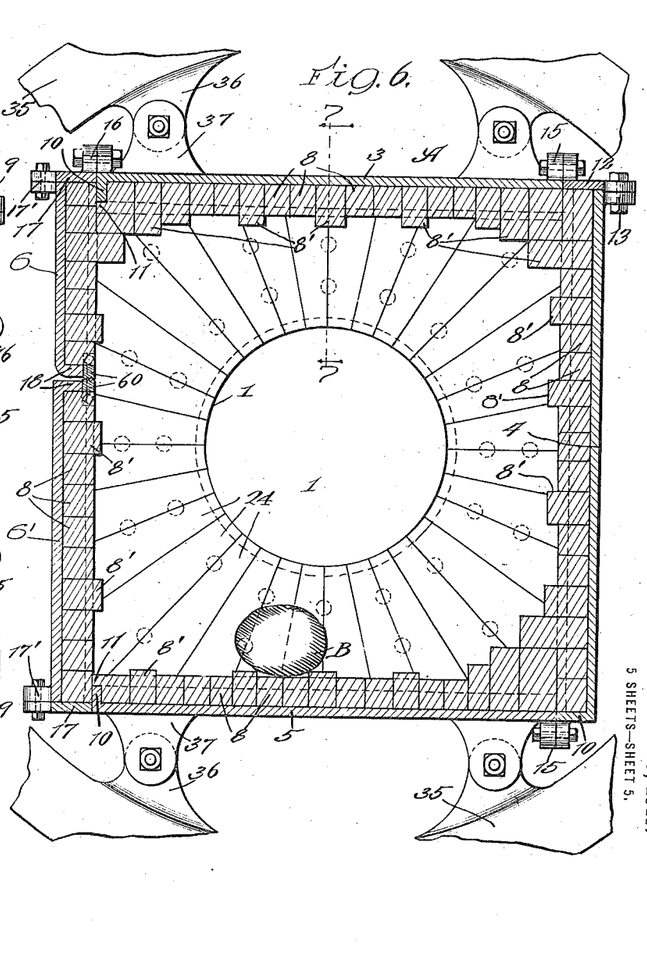
Fig. 6 is an enlarged transverse vertical section of the furnace chamber on the line 6—6 of Fig. 1.

The heating chamber is composed of a plurality of rectangular cast iron plates which constitute the end and side walls, the interior faces of which are suitably lined with refractory material. The end walls 1 and 2 have central circular openings 1' and 2' respectively to admit the heat to, and allow the escape of waste heat and gases from, the chamber so that the furnace may be rotated while the metal is being heated. The side walls are formed by four plates, 3, 4, 5 and 6, and constitute the metal working surface. The side plate 6 is made in two sections, the section 6' of which forms a swinging door. Each of these plates is provided with an independent lining of refractory material. In practice I make the linings for the plates of individual fire bricks, although for the purpose of my invention the interior of the furnace may be lined in any manner found to be best adapted to the particular conditions. However, as before intimated, I prefer to construct all of the furnace parts in such manner that they may be readily assembled and disassembled. For these reasons I provide the side plates 3, 4 and 5 with a plurality of parallel dove-tail grooves 7 on their inner faces, so that they may be independently lined, as clearly shown in Figs. 1, 5, 6 and 7. The bricks in all of the side walls are correspondingly dove-tailed and are fitted into the grooves in rows. These plates are finished off on their end edges by flanges which reach to the height of the bricks, and one end of the dove-tailed grooves is closed by a flange 10, the other end being open to permit insertion and removal of the bricks. In the case of the plates 3 and 5 this flange 10 reaches to about half the height of the bricks and the adjacent end bricks overhanging the flanges as at 11 to protect the plate from heat; while in the case of the plate 4 the flange 10 is equal in height to that of the end flange 9, as shown in Fig. 6.

The bricks are firmly held against movement in the slots or grooves by pressure. For this purpose the side plate 4 is provided with an end-cap 12, which is removably champed against the ends of the rows of bricks by several lugs and bolts 13 distributed along the edge of the plate and cap. This plate 4 is constructed in this manner so that it may be conveniently removed or replaced as a unit without disturbing the other plates, to facilitate relining the furnace. I utilize this plate as cap for the plates 3 and 5, as clearly shown in Fig. 6, instead of a separate cap. The side plate 4 has a plurality of lugs 15 cast at points around its edge and these register with corresponding lugs on the side plates 3 and 5, and the end plates 1 and 2. These lugs and the clamping bolts passing through them provide simple but effective fastenings for the plate 4. The door plate 6 and the bricks therefor are constructed similar to the other side plates particularly the plate or wall 4, and like the plate 4, is removable without disturbing the other parts of the furnace. As shown only the upper section thereof, however, is fastened by the bolts and lugs 16 distributed on the edges thereof, the lower section being left free to swing as a door. On account of the fact that this plate is made in two sections, it is necessary that an end cap 17 be provided for each section so that each section may be relined independently. The caps 17 are removably secured by the bolts and lugs 17', and are placed at opposite edges so that the plate flanges 18 which close the ends of the dove-tail grooves will both be at the division line between the two sections (see Figs. 6, 8 and 9), and thus provide a suitable mounting for the cheek plate 60. These cheek plates consist of long bars extending the length of the door plate and seated in the cut-away corner of the flanges. They have turned ends 61 which are bolted to the outside of the plate flanges so that they may be removed. These cheek plates protect the door and upper section from the heat and may be cheaply replaced when burned. In addition to this, the abutting faces 62, as shown, may be corrugated or grooved for breaking up slag or cinders which collect and tend to prevent the door from closing properly. If desired, however, the abutting faces may remain flat and still be relied upon to brush most of the cinders and crush the remainder of what may collect between the edge of the door nearest the hinges thereof, and the door jamb adjacent the same.

Figure 2:
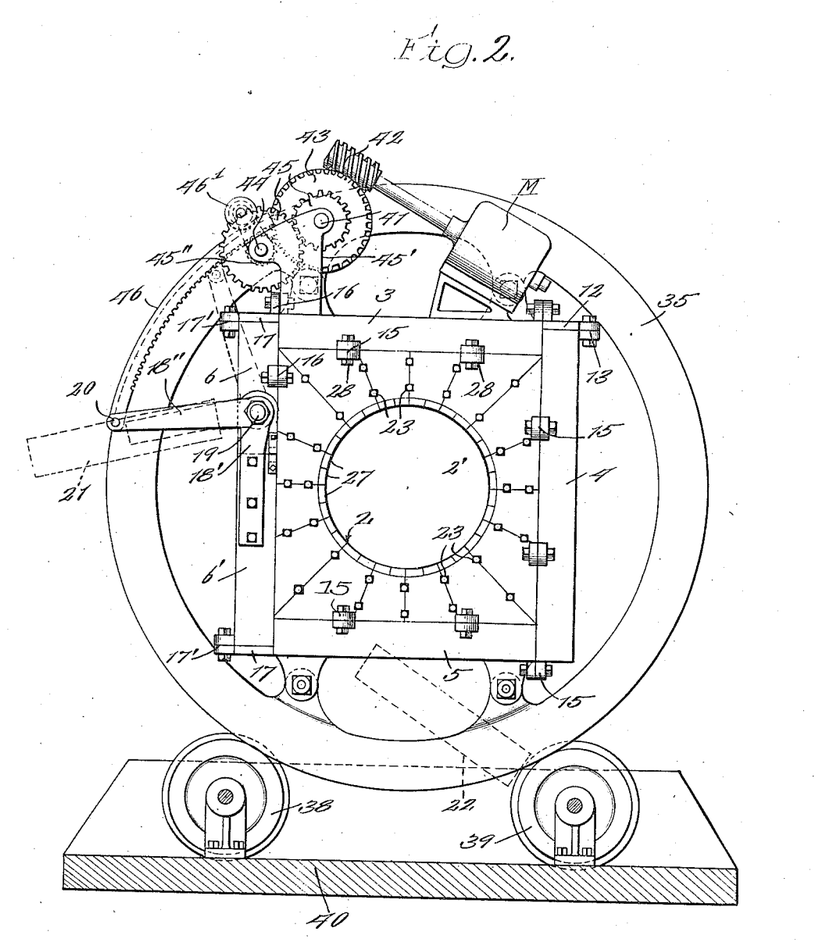
Fig. 2 is an end elevation of the furnace, one of the supporting wheels being removed to better disclose the parts.
Figures 2, 3, 9:
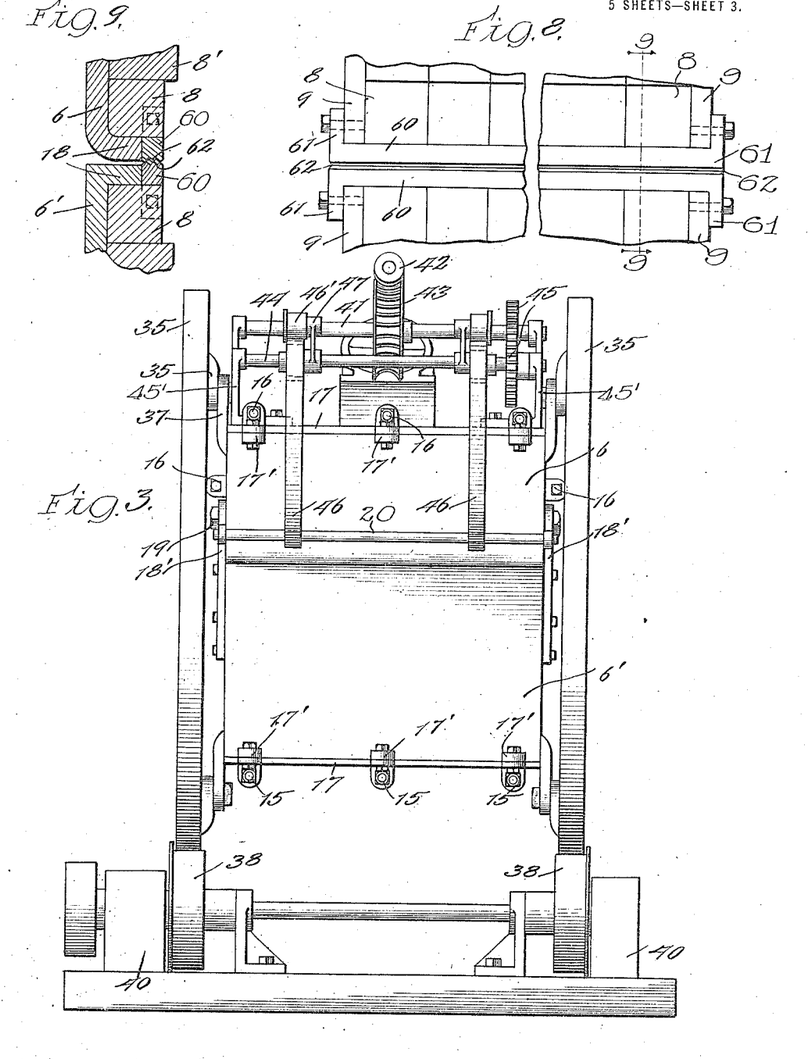
Figure 4:
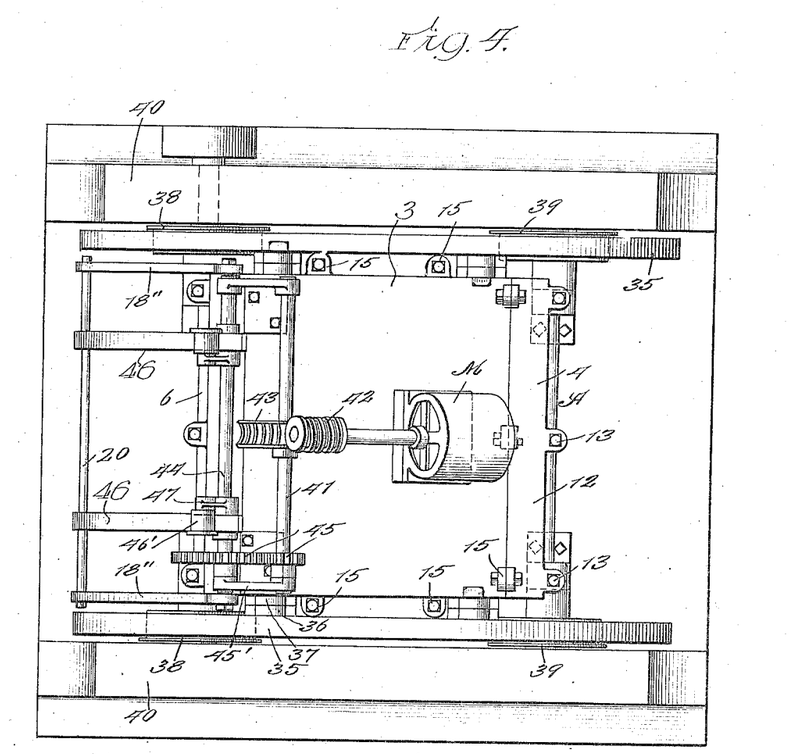
Fig. 4 is a top plan view thereof.
Figure 5:
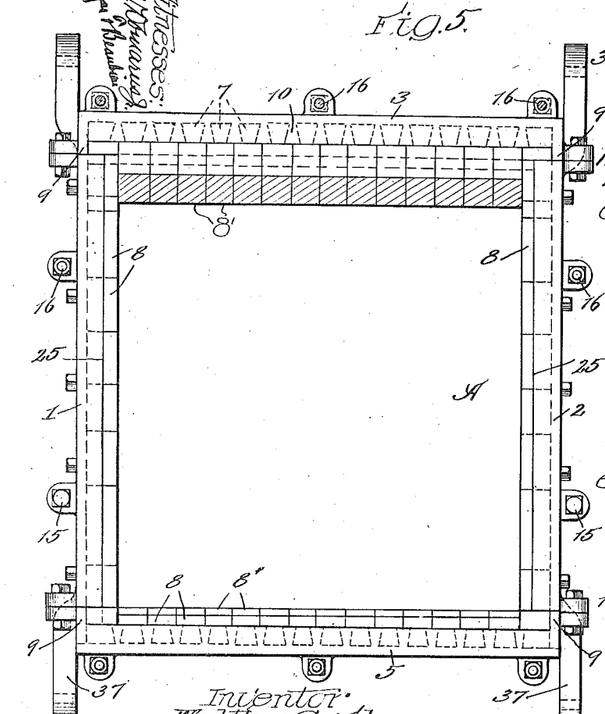
Fig. 5 is an enlarged side view of the heating chamber with the side or door plate removed.

The door 6' is shown in Fig. 2 hinged at 19, at a distance from the lower edge of the section 6. The supports for the door comprise bell crank levers 18' bolted to the ends of the door and pivoted at 19 in the upper section 6, as shown. The arms 18'' of the bell crank levers, project substantially at right angles from the door and upwardly therefrom, as shown in Fig. 2. The outer ends of the arms 18'' are connected together by means of the longitudinal rod 20, as shown in Figs. 2 and 3. When the electric motor M is operated, motion will be transmitted to the arcuate racks 46, 46 which are connected to intermediate portions of the rods 20. When the arms 18'' are moved toward the dotted line position shown in Fig. 2, the door 6'' is swung toward the dotted line position indicated at 21. The furnace is then in such position that the opening in the body portion thereof may be used as a charging opening for the furnace. For charging the furnace, the door is usually swung wide open, but in discharging the bloom, it is only swung about half way open, as shown by the dotted line 22 in Fig. 2. In the latter position, the door serves as an incline down which the bloom may roll by gravity to a position where it can be received by a conveyer.

When the furnace is operated, the molten slag or cinders flow over the interior surfaces. When it is impracticable to obtain an air tight fit between the upper surface of the door and the lower surface of section 6, the inrush of air cools some of this molten slag to cause an accumulation of a cinder seal along the upper inner edge of the door and the lower inner edge of section 6. The pivots 19 are preferably so located that when the door is opened the inner upper edge of the door will immediately move away from the adjacent edge of section 6 so as to more easily break this cinder seal.

When the furnace is stopped with the door on the under side, and the bloom is ejected by permitting it to roll over the inner surface of the door operating as an incline, the molten slag also runs out and over the edge of the opening along the section 6. The cooling of a portion of this slag tends to prevent the door from again being closed. The door being mounted on supports which are pivoted at 19, at a distance from the edge of the opening, causes the edge of the door nearest the pivots, to have a sliding motion upon closing, which shears off the accumulated slag or cinders and permits the door to be fully closed. It is therefore evident that by locating the pivots for the door supports at 19, as shown in Fig. 2, there are combined in a single structure, the function of shearing away practically all of the accumulated cinders and crushing the small amount that remains when the door is closed, and the function of permitting the aforesaid cinder seal to be easily broken when power is applied to the door to open the same.

It should be noted that the electric motor and the door operating mechanism between the motor and the door, comprising the worm gearing for locking the door in adjusted position, are operated independently of the rotation of the entire furnace. Therefore, the electric motor mounted on the furnace, together with the door actuating mechanism, may be operated at any time during a complete rotation of the entire furnace in either direction, and even after the furnace has been rotated continuously for some time. This arrangement permits great flexibility of control of the rotation of the metalworking furnace, and of the opening and closing of the door at any time, whether the furnace is rotating or not and irrespective of the direction of rotation thereof. It should also be noted that the end interior surfaces of the furnace are in flat, vertical planes and that therefore a bloom having a length of approximately the distance between such end surfaces, can be uniform diameter throughout and also homogeneous from end to end, thereby permitting the entire bloom to be rolled into rods or other shapes with minimum loss of material, as very little if any of the ends have to be cut off. It will thus be seen that ordinary scrap iron is readily cleansed of substantially all impurities during the first stages of the operation, and that by one continuous operation the impurities are eliminated, the metal brought to a viscous state and then thoroughly rolled as well as being picked up and dropped back to secure a pounding action whereby the bloom attains a homogeneous, fibrous structure lengthwise of the bloom from end to end and a diameter which is uniform from end to end. The product therefore is one which not only can be rolled with minimum loss of material, but is also one which has considerable strength against tensile strains.

Figure 1:
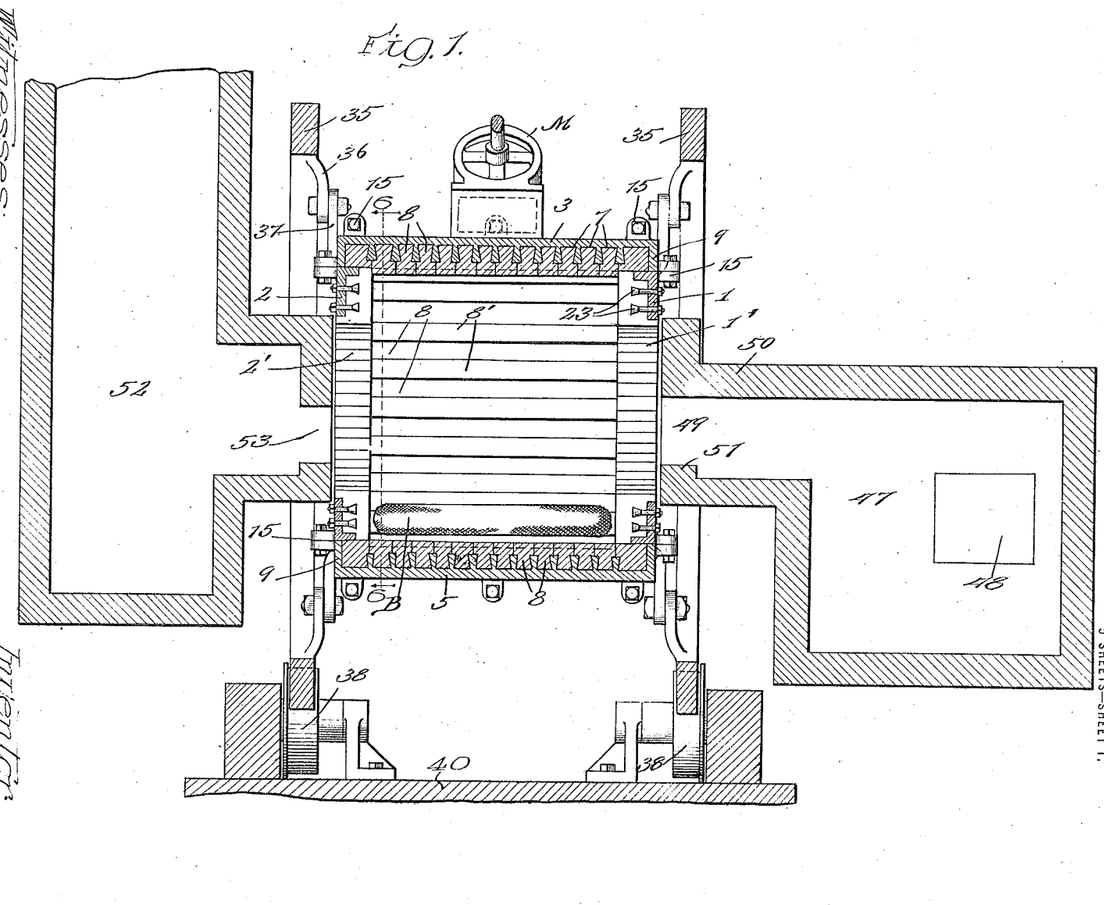
Figure 1 is a sectional view illustrating the above-mentioned furnace in operating relation to a fuel combustion chamber and a stack from which the heat is derived and carried off.
Figure 7:
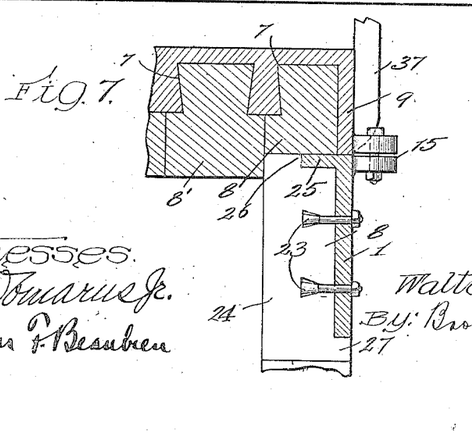
Fig. 7 is an enlarged detail section on line 7—7 of Fig. 6 showing the manner in which the end plates and side plates are lined with fire brick, and also the manner in which these plates fit together.

Although it is possible to mount the bricks for the end plates in dove-tail grooves in the same manner as the side plates, I prefer to use a number of expansion bolts 23 of the usual type at the joints between the bricks. The bricks 24 of these walls are of the "radial" or "circle" type (Figs. 1, 5, 6 and 7). As shown, particularly in Fig. 7, the plates have flanges 25 on their four outer edges to finish off these edges and to hold the bricks against movement in any direction, but this flange rises only to about half the height of the bricks and the bricks overhang them as at 26 to protect the plate from the heat. The inner ends 27 of the bricks conform to the circular openings 1' and 2' and likewise overlap the inner edges of the plates for protection purposes. The end plates 1 and 2 are set into the respective ends of the furnace so that their outer faces are flush with the edges of the side plates (Figs. 1 and 7). These like the side plates, are bolted in position, a number of lugs 20 being cast at corresponding intervals around the end plates and side plates adjacent their meeting edges.

I have described the metal working chamber shown in the drawings with considerable particularity in order that a full understanding may be had of both the process and a satisfactory structure by which it may be mechanically carried into effect. The scrap metal practically cold may be charged into the furnace through the door 6' by manual or power shovels or otherwise as desired, the heating chamber being in the position shown in Fig. 2. The charge is spread over the inner wall or surface of the side plate 5, and at this point it may be well to say that, as before intimated, herein lies one of the important advantages of making the chamber rectangular, or substantially so, in transverse section. A large area is thus provided over which the charge may be spread and the charge rapidly and thoroughly heated, and as the furnace is rotated or oscillated the charge will be gradually though rapidly massed. The steady rotary or oscillating motion of this furnace continually inclines the side walls, and the metal, due to the action of gravity, continually tends to seek the lower portion of the chamber. In doing this, it is subjected to a rolling or tumbling action, so to speak, which gradually masses it and works out the impurities. In this structure the side walls are straight, that is, the surface or wall which manipulates the metal is disposed in a straight line longitudinally of the furnace and is on the level. As the furnace rotates, the straight, level surface is continually maintained. Hence, the longitudinal axis of the gradually forming mass remains practically parallel to the surface, thus forming a homogeneous, purified bloom. In order to enhance and expedite these forming and manipulating actions, I prefer to make the inner side walls or surfaces somewhat irregular or corrugated. This may be done very easily in this structure by using longer bricks 8' at intervals along the plate surfaces and in the corners, as clearly shown. These may be placed in the dove-tail grooves in such manner as to form longitudinal rows or ridges projecting above the normal brick level. The filling in of the corners rounds off the rectangular path in which the metal travels and the forming of the charge is steadied. The corner at the door is preferably not filled in by longer bricks. This leaves a generally flat surface upon which to charge the cold scrap. As before indicated, the longer bricks 8' perform the functions of maintaining the forming charge in a substantially parallel relation to the longitudinal axis of the furnace. In other words there will be less tendency for one end of the charge to lag behind the other. In addition the protruding bricks 8' serve as abutments for the outer ends of the circular bricks on the end plates and positively prevent the circular bricks from leaving the plates.

The rotation or oscillation of the furnace may be accomplished in any suitable manner, even manually, if desired, accordingly as operating conditions permit. In a large furnace weighing several tons like the one herein shown and described, manual operation would be impractical, or at least far too slow. For these reasons I prefer to operate both the furnace and the door by power mechanism, and control these mechanisms from a convenient position in view of the entire apparatus. I support the furnace chamber A centrally between two wheels or rims 35 of comparatively large diameter to provide a balanced structure. These wheels are sufficiently apart to permit free access to the door-plate and the side plate 4. They have short spokes or lugs 36 which are detachably bolted to corresponding offset lugs 37 outstanding from the side plates 3 and 5 as clearly shown in the drawings. The wheels rest upon and are frictionally driven by flanged rollers 38 and 39. These rollers are suitably journaled in bearings in the piers or foundation 40. It is only necessary to drive one set of these rollers (as for instance 38) and this is preferably done by an electric motor (not shown).

The operation of the side door 6' is preferably accomplished by means of a small reversible electric motor M and intermediate mechanism, which may be controlled from the same position and by the same operator as the furnace. The motor and mechanism may be mounted on the outside of the heating chamber. As clearly shown, the motor drives a shaft 41 through the speed reducing worm and gear 42 and 43. This worm and gear also serve as a brake to automatically hold the heavy door in any position in which it is placed. The shaft 41 drives another parallel shaft 44 through the medium of the spur gears 45, which further reduce the speed of the motor. Both shafts 41 and 44 are journaled in bearings 45'. The latter shaft carries two spur pinions 45" which drive a pair of curved toothed racks 46. These racks are maintained in engagement with the pinions by a pair of idler rollers 46' carried by arms 47 swingably mounted on the shaft 45. Corresponding ends of these racks are pivotally journaled on the shaft 20 which connects the arm 18" of the bell-crank levers 18 on the door. In this manner the power of the motor is transmitted to the door at proper speed to open and close the door. It will be noted that the door actuating mechanism is compactly positioned substantially within the confines of the wheels and does not interfere with the rotation or oscillation of the furnace. Furthermore, by reason of the fact that the pivotal points 19 are arranged considerably above the edge of the door and the arms 18' project from these points, a greater leverage may be obtained, shorter racks may be used and the door may be swung clear of the door opening.

In Fig. 1 I have shown diagrammatically a fuel combustion chamber 47 positioned at one end of the furnace, by way of illustrating the manner in which heat may be supplied to the furnace from an external source. This combustion chamber has a stoke-hole 48 and a narrow mouth or throat 49, which is formed between the top wall 50 and the lower bridge 51. The mouth is arranged to supply heat to the interior of the furnace through the open end thereof, and is preferably positioned mainly below the center of the furnace, so as to supply heat as close to the scrap metal as possible at all times during the operating of the furnace. The waste or excess heat and gases pass off through the opposite end opening in the furnace and may be collected by a flue or stack 52 for other heating purposes. The fuel or stack has an opening 53 through which the heat passes, and this likewise is preferably disposed below the center of the furnace. Thus no interference or interruption in the continuous use of the heat for other purposes is occasioned by the operation of the furnace, and the furnace need never be removed from its position except, however, perhaps for the purposes of repair.

It will readily be appreciated, particularly by one who understands the present methods of handling scrap metal, that my invention dispenses with the necessity of employing expensive skilled labor for manipulating the charge. Instead the entire operation may be controlled by one man, and a much larger output may be obtained in less time and at less expense. A large quantity of metal may be charged into the furnace chamber and a workable bloom may be directly produced ready for the mills. The terms "scrap metal", "metal scrap", and "charge" as used herein are to be understood as meaning any metals, such as steel and iron scrap, puddled iron and the like, which may be reworked to form a bloom.

My invention is capable of modification to adapt it to particular operating conditions without departing from the scope and spirit thereof and is to be construed accordingly.

What I claim is:

1. In a bloom producing furnace, the combination with a chambered structure comprising a plurality of flat walls with their longitudinal edges extending parallel to the longitudinal axis of said structure and having end walls substantially perpendicular to said longitudinal walls, and means for rotating said chambered structure to cause the flat longitudinal walls to successively pick up the metal and let it drop by gravity onto the next lower wall to form the mass of metal into an elongated bloom of a length substantially equal to the said longitudinal flat walls.

2. A metal working furnace comprising a chambered structure having a charging and discharging opening therein, a door pivoted to said structure, means for rotating said chambered structure and power mechanism mounted on said structure for swinging said door on its pivot to open or closed position.

3. A metal working chambered structure having heat openings in the ends thereof and a charging and discharging opening in the body portion thereof, a door for said charging and discharging opening, means for rotating said chambered structure, and door operating mechanism mounted on said chamber and movable therewith.

4. A metal working furnace comprising a chamber having a charging and discharging opening in the body thereof, means for rotating said chamber, a door for said opening, pivoted supporting means for said door having its pivotal point spaced apart from said opening, and means for operating said door to open and close the same.

5. A metal-working furnace comprising a chamber, means for supplying heat to said chamber, a door for an opening in said chamber, means for rotating said chamber, and power mechanism carried by said furnace and moving therewith, to operate said door.

6. A metal working furnace comprising a rotary chamber having a charging and discharging opening in the body thereof and heat openings in the ends thereof, a door for said charging and discharging opening, means for rotating said chamber, and mechanism independent of said rotating means and mounted on said rotary chamber to move therewith for operating said door to open and closed positions.

7. In a furnace of the class described, a rotary open ended furnace chamber composed of a plurality of flat refractory lined metal plates separably assembled together to form the side and end walls of said chamber, opposed central heat openings in said end plates and a door in one of said side plates, door operating mechanism mounted upon the side walls of said chamber, and power operated supporting mechanism at the ends of said chamber and removably attached thereto.

8. A metal working furnace comprising a chamber, means for supplying heat to the interior of said chamber, a door for a charging and discharging opening in said chamber, and a support for said door pivoted to said chamber at a distance from said opening to cause the ends of the door near the pivot to recede from the adjacent edge of said opening immediately after the door begins to swing toward open position, and to cause said edge to slide over the adjacent edge of said opening when the door is being closed.

9. In a furnace of the class described, a metal working chamber composed of a plurality of sectional members detachably assembled and forming the walls of said chamber, central heat openings in the end walls of said chamber, and a charging door in a side wall of the chamber, door operating mechanism mounted upon the outer side walls of said chamber, large end wheels centrally and rotatably supporting said furnace, and mechanism for frictionally driving said wheels at their peripheries.

10. A furnace of the class described, comprising a chambered structure composed of a plurality of unitary lined plates, assembled together and forming a polygonal chamber, circular heat openings in the end walls, a hinged door in a side wall of said structure, a motor driven door operating mechanism mounted upon said structure, a large wheel removably secured to each end of said structure, and frictional driving members upon which said large wheels rest and by which they are driven to rotate the furnace.

11. A bloom producing furnace of the class described, comprising a pair of annular rims of large diameter, in combination with a metal working furnace positioned between and centrally supported by said rims, and door operating mechanism mounted on said furnace, all within the general confines of said rims.

12. A metal-working furnace comprising a door for an opening in the body portion thereof, and means for positioning said door so that its inner surface serves as a support for the worked material while the furnace is being discharged.

13. A rotary metal-working furnace comprising a door for an opening in the body portion of said furnace, and mechanism for operating said door while the furnace is rotating.

14. The combination with a rotary metal-working furnace, of a door for an opening in the body portion of said furnace, means mounted on said rotary furnace for operating said door in any position of said furnace throughout an entire rotation thereof, and frictional driving mechanism for rotating said furnace.

15. In a furnace of the class described, a heating chamber composed of a plurality of flat metal plates assembled together and forming the end and side walls of said chamber, a refractory lining for each of said plates, slots in said side plates for fastening the lining thereto, and means for exerting pressure longitudinally of said slots to prevent the movement of said lining.

16. In a furnace of the class described, a plurality of chamber-forming members, each comprising a slotted metallic plate, a plurality of fire bricks secured in said slots and forming a refractory lining for the plate, a flange on said plate closing one end of the slots, and a detachable end cap closing the opposite end of said slots and compressively holding the bricks therein.

17. The combination of a chambered furnace structure, rectangular in longitudinal section, comprising a plurality of metallic plates, means separately holding said plates together, and an individual refractory lining for each plate comprising a plurality of fire brick arranged in rows, the fire brick in said rows being held against movement in one direction by the adjacent plate, and means for holding said brick against movement in the opposite direction.

18. The combination of a chambered furnace structure, rectangular in longitudinal section, comprising a plurality of metallic plates, means separately holding said plates together, and an individual refractory lining for each plate comprising a plurality of fire brick arranged in rows, the fire brick in said rows being held against movement in one direction by the adjacent plate, and means for holding said brick against movement in the opposite direction.

19. In a furnace structure of the class described, the combination of a plurality of flat metallic plates, and means for removably fastening the said plates together to form a furnace chamber rectangular in longitudinal section, each of said plates being provided with a plurality of dovetail grooves on its inner face, a common flange inclosing the corresponding end of each of said grooves, a plurality of refractory fire brick in said grooves, and means for compressing said brick to prevent the movement of said bricks.

20. In a furnace structure of the class described, the combination of a plurality of flat metallic plates, and means for removably fastening the said plates together to form a furnace chamber rectangular in longitudinal section, each of said plates being provided with a plurality of dovetail grooves on its inner face, a common flange inclosing the corresponding end of each of said grooves, a plurality of refractory fire brick in said grooves, and means for pressing the bricks in a direction longitudinal of said grooves to prevent movement of the brick in said grooves.

21. In a metal-working furnace, the combination with a chambered structure having an opening in the body portion thereof, of a door for such opening, means for supporting said door to cause the inner edge thereof to slide past the body edge of said chambered structure to remove accumulated cinders upon closing the door, and power mechanism for operating said door.

22. The combination of a chambered structure comprising a plurality of unitary plates forming end and side walls of said chambered structure, each of said plates having a plurality of refractory bricks forming a lining therefor, means individual to each plate for holding the bricks against movement, means for separably fastening said plates together, separating rims at the ends of said furnace structure, and means for driving said rims to rotate the furnace.

23. The combination of a rotary chambered structure having a side wall formed in two sections, one of said sections constituting a door, suitable hinge supports for said door section, and coöperating cinder crushing devices on the adjacent edges of said door section and said other section.

24. In a metal-working furnace, the combination with a rotary chambered structure having an opening in the body portion thereof, of a door for such opening, the inner surface of said door forming a part of the interior walls of said chambered structure, supports for said door hinged to said chambered structure at a distance from said opening to cause the inner wall edge of said door nearest the hinge to separate from the body wall edge as soon as the door is moved from closed toward open position and to cause said inner edge of the door to slide past said adjacent body edge in close proximity thereto to remove accumulated cinders upon closing the door, and power mechanism for swinging the door upon its hinges.

25. In a metal working furnace, the combination with a rotary chambered structure having an opening in the body portion thereof, of a door for said opening, supports for said door pivoted to said chambered structure at a distance from the edge of said opening, motor driven mechanism mounted on said rotary chambered structure and moving therewith for swinging the door upon its hinges, and frictional driving mechanism for rotating said chambered structure.

26. The combination with a rotary metal-working furnace, of a door for a charging and discharging opening in the body portion of said furnace, and means mounted on said rotary furnace for opening or closing said door in any position of said furnace throughout an entire rotation thereof.

27. The combination with a rotary metal-working furnace, of an electric motor mounted on said furnace, a door for an opening in the body portion of said furnace, and door-operating mechanism connected between said motor and said door to effect the opening or closing of said door while the furnace is rotating and in any position thereof.

28. The combination with a metal-working furnace, of a door for an opening in the body portion thereof, and means comprising a motor and worm gearing connected to said door and mounted on said furnace for opening and closing said door.

29. The combination with a rotary metal-working furnace, of a door for an opening in the body portion thereof, an electric motor mounted on the exterior of said furnace and moving therewith, and door-operating mechanism connected between said motor and said door and comprising worm gearing, to lock the door in adjusted position.

30. The combination with a rotary metal-working furnace, of a door for an opening in the body portion of said furnace, an electric motor fixed to said furnace and moving therewith, and door-operating mechanism connected between said motor and said door, said door being capable of being opened or closed by said motor and door-operating mechanism independently of the rotation of the furnace and in any position thereof.

31. The combination with a rotary metal-working furnace, of a door for an opening in the body portion thereof, door-operating mechanism mounted on said furnace, a motor also mounted on said furnace and connected to said door-operating mechanism, movable with the furnace, and means for supporting said rotary furnace for freedom of complete rotation independently of said door and said door-operating mechanism and said motor.

32. The combination with a rotary metal-working furnace, of a door for an opening in the body portion thereof, a motor mounted on and moving with said furnace, and door-operating mechanism between said motor and said door to effect the opening of said door while the furnace is being moved to charging position, and to effect the opening of said door while the furnace is being moved to discharging position where the interior surface of said door itself acts as an inclined plane to direct the worked material from the furnace to a predetermined position.

33. The combination with a metal-working furnace comprising a rotatable chamber having a door for an opening in the body portion thereof, of power mechanism under the control of the operator for operating said door while said chamber rotates.

34. The combination with a metal-working furnace, of means for rotating said furnace, a door for an opening in said furnace, and power mechanism for operating said door independently of the rotation of said furnace.

35. A metal-working furnace comprising a door for an opening in said furnace, and means for operating said door to cause its inner surface to act as an inclined plane to direct the worked material to a predetermined position while discharging.

36. A metal-working furnace comprising a door for an opening in the body portion thereof, and power mechanism for operating said door while its inner surface supports the worked material and while said furnace rotates.

37. A rotary metal-working furnace comprising a door for an opening in the body portion thereof, and power mechanism for operating said door independently of said furnace to cause the inner surface of said door to serve as a support for the worked material while the latter is lifted to a higher elevation before being discharged from the furnace.

38. The combination with a rotary metal-working furnace, of means for supplying heat thereto, a door for an opening in the body portion of such furnace, and electricmotor-driven mechanism carried by and movable with said metal-working furnace, for actuating said door.

39. The combination with a rotary metal-working furnace, of a door for an opening in the body portion thereof, a motor mounted on said furnace and moving therewith, and operating connections between said motor and said door, said operating connections comprising means for retarding movement of the door when said motor is not being operated.

40. The combination with a rotary metal-working furnace, of a door for an opening in the body portion thereof, an electric motor mounted on said furnace and moving therewith, and connections between said motor and said door comprising means for retarding movement of the door when said motor is not operating.

41. A metal-working furnace comprising a chambered structure, a door for an opening in said structure, a motor mounted on said structure for operating said door, and frictional driving means for rotating said chambered structure, said driving means slipping if the door engages an obstacle preventing the rotation of said furnace.

42. The combination with a rotary metal-working furnace, of a door for a charging and discharging opening in the body portion of said furnace, mechanism for opening and closing said door in any position of said furnace throughout an entire rotation thereof, and frictional driving mechanism for automatically rotating said furnace.

43. A metal-working furnace comprising a chambered structure, means for supplying heat thereto, a door for an opening in said structure, an electric motor for operating said door, and frictional driving mechanism for rotating said chambered structure.

44. A metal-working furnace comprising a door having substantially the same thickness as the walls of said furnace and forming part of said walls when in closed position, means for rotating said furnace, and power mechanism mounted on said furnace and moving therewith for operating said door.

45. A metal-working furnace comprising a chamber, a door having substantially the same thickness as the walls of said chamber, and having its inner surface forming a continuation of the inner surfaces of said walls, and means for supporting said door to cause one longitudinal edge thereof to slide over an adjacent edge of said chamber while said door is being closed to scrape away accumulated cinders.

In testimony whereof I have signed my name to this specification, in the presence of two subscribing witnesses, on this 11th day of December A. D. 1911.

WALTER C. ELY.

Witnesses:
EDGAR F. BEAUBIEN,
ESMÉE WALTON.